United States Patent Office 3,474,214
Patented Oct. 21, 1969

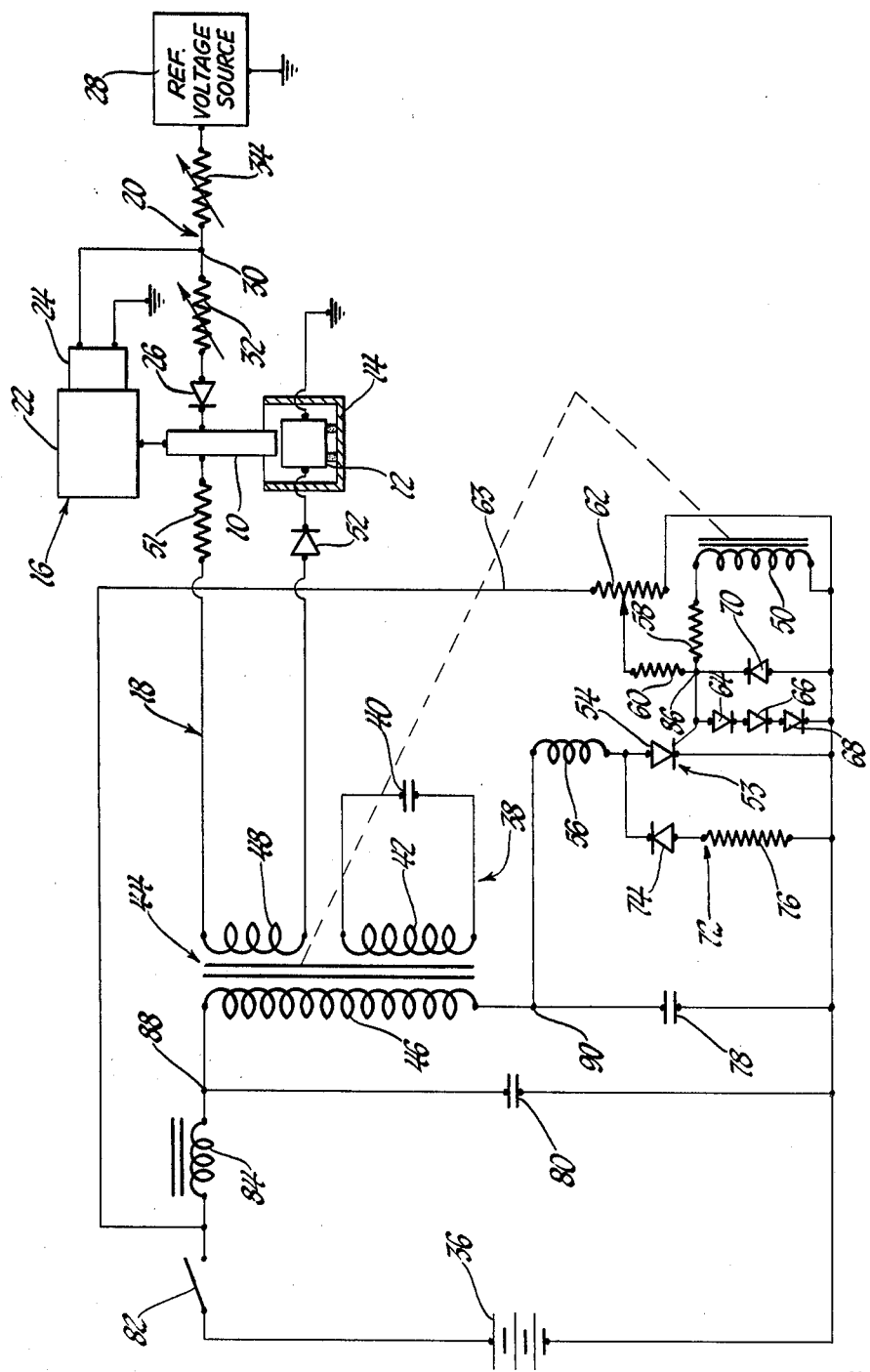

3,474,214
POWER SUPPLY FOR BOTH HARDENING AND ELECTRICAL DISCHARGE MACHINING WORKPIECES
Millard A. Ferguson, Utica, Mich., assignor to General Motors Corporation, Detroit, Mich., a corporation of Delaware
Filed Apr. 8, 1966, Ser. No. 541,168
Int. Cl. B23k 9/16
U.S. Cl. 219—69                                     5 Claims

ABSTRACT OF THE DISCLOSURE

A power supply utilizing a DC source for supplying pulsating energy to a gap formed between a tool and a workpiece which is either to be machined or hardened. A transformer couples the DC source and a parallel resonant circuit to the gap. A switching provision incorporating an SCR responds to the operation of the parallel resonant circuit and causes the transformer to be connected to the DC source so as to drive the parallel resonant circuit at its resonant frequency and also to supply the pulsating energy to the gap.

---

This invention relates to improvements in electrical metal processing apparatus, and particularly to a power supply therefor adapted, although not exclusively, for use by the apparatus to both machine and harden workpieces.

In my earlier application Ser. No. 484,305, filed Sept. 1, 1965, method and apparatus were disclosed for both machining and hardening workpieces. This application described electrical discharge machining apparatus capable of, first, applying pulsating energy across a dielectric fluid-filled gap between the cutting tool and the workpiece for machining the workpiece in the usual way and, secondly, applying pulsating energy to the gap after the application of a coating of a paste-like substance to the machined workpiece for melting the paste-like substance to provide a hard, wear-inhibiting surface on the workpiece. Usually, this pulsating energy is supplied by a relatively expensive motor-generator set. It will be appreciated, therefore, that this expense can discourage the use of the apparatus for low volume work or when used only for workpiece hardening.

For the foregoing reasons a novel power supply is contemplated that is substantially less costly than a motor-generator set, that is capable of effeciently providing large or small amounts of power, and that can utilize a DC source and develop therefrom pulsating energy at a suitable operating frequency.

Somewhat more specifically stated, the novel power supply utilizes a DC source and a parallel resonant circuit, which are both coupled to the load. The parallel resonant circuit is driven at substantially its resonant frequency and causes the power supply to energize the load at this same frequency.

In carrying out the invention, according to one embodiment thereof, a transformer is employed to couple both a DC source and a parallel resonant circuit across a gap. The primary of the transformer is in circuit with a controlled rectifier, which initially is rendered conductive when the DC source is connected to the primary to start the transfer of energy therethrough. This energy, applied to the primary, drives the parallel resonant circuit during one-half cycle of operation and also charges capacitors. One of these capacitors is connected across both an inductor and the controlled rectifier and will be caused by the inductor after developing a certain charge to discharge through the inductor and the controlled rectifier in the forward direction. The resultant reverse charge will render the controlled rectifier nonconductive. The other of these capacitors will then discharge into the reverse charged capacitor and, during the restoration of the charge thereon, the controlled rectifier is again turned on to complete a cycle. This energy for driving the parallel resonant circuit is supplied substantially in resonance therewith and, correspondingly, is the frequency at which the energy is supplied to the gap.

The foregoing and other objects and advantages of the invention will become apparent from the following description and from the accompanying drawing in which the single figure shows schematically apparatus for carrying out the invention.

Referring to the drawing now for the details of the apparatus, the numerals 10 and 12 denote electrodes, which will hereinafter be referred to respectively as the cutting tool and the workpiece. The workpiece 12 is supported within and electrically isolated from a tank 14. When the workpiece 12 is to be machined, the tank 14 will be supplied with a suitable dielectric fluid from a source, not shown. The cutting tool 10 is shown maneuverable relative to the workpiece 12 by a feed mechanism 16. Of course, the workpiece 12 could be maneuvered relative to the cutting tool 10 by the same mechanism 16 if wanted, or both the cutting tool 10 and the workpiece 12 can be made individually movable. Energy from a power supply, designated generally at 18, is applied to a gap maintained between the cutting tool 10 and the workpiece 12 and discharges occur thereacross for either machining or hardening purposes, as will be further explained.

The feed mechanism 16, which maintains the gap spacing, is operated by gap spacing control 20. These may be of the kind illustrated and described in the Ferguson Patent No. 3,213,258. Briefly, the mechanism 16 includes a piston type, fluid pressure actuated motor 22. Fluid pressure is supplied to the motor 22 from an appropriate source by a force motor 24 in accordance with error signals derived from the gap spacing control 20. As the control 20 senses the voltage across the gap, which voltage is made unidirectional by a rectifier 26, this gap voltage is compared with a reference voltage from a source 28 at a summing junction 30. The reference voltage reflects the desired gap spacing, the gap voltage, the actual gap spacing. Any differential results in an error signal voltage and is applied to the force motor 24, which causes the motor 22 to change the gap spacing until the error signal is nulled. Calibrating resistors 32 and 34 and the adjustment of the reference voltage source 28 enable the feed rate to be altered as well as the gap spacing at which the apparatus is to be operated.

The power supply 18 includes a DC source 36, a parallel resonant circuit or, as it will be subsequently referred to, a tank circuit 38, which includes the usual capacitor 40 and inductance, such as a winding 42, and a transformer 44. The transformer 44 couples both the DC source 36 and the tank circuit 38 across the gap and includes a primary winding 46, a secondary load winding 48, and a secondary control winding 50, all of which can be wound on the same core. The load winding 48 is connected across the gap and is in series with a current limiting resistor 51 and a rectifier 52, which provides half-wave rectification. It will be understood that the tightness or looseness of the coupling between the windings will be determined by the usual factors.

The tank circuit 38 is operated by a switching provision, denoted generally by the numeral 53, and in this embodiment includes a controlled rectifier of any suitable type, such as the well known silicon controlled rectifier, which hereinafter will be identified as SCR 54. The anode of the SCR 54 is connected through an inductor 56 to the primary winding 46 of the transformer 44, the cathode is connected to the DC source 36, and the gate electrode communicates with the control winding 50 through a resistor 58 and with the DC source 36 through biasing resistors 60 and 62, the latter of which is shown as adjustable. In a well known way positive clamping diodes 64, 66 and 68 and a negative clamping diode 70 maintain the control voltage derived from the control winding 50 within predetermined positive and negative limits; e.g., 2 volts positive and .6 volt negative, so as to provide efficient turn-on of the SCR 54. As will become apparent, the switching by the SCR 54 is in synchronism with the operation of the tank circuit 38 and is tuned accordingly.

The turn-off of the SCR 54 is facilitated by the inductor 56. A bleeder branch 72 comprising a rectifier 74 and a resistor 76 protects the SCR 54 during turn-off. Also contributing to the turn-off is a capacitor 78, which is in series with the primary winding 46 and in parallel with the SCR 54. The function during the SCR turn-off and turn-on of a capacitor 80, which is connected across the DC source 36, will be described in the following operational summary.

The operation of the apparatus including that of the power supply 18 will now be described, while assuming that the workpiece 12 is first to be machined. Hence, the approximate gap spacing is initially established and the dielectric fluid supplied to the tank 14. To turn on the power, a power switch 82 is first closed. Current then flows through a choke coil 84 which functions to, in effect, produce a constant current flow and also isolates the R.F. components from the DC source 36. This initial surge of current will energize the control winding 50 but not with a voltage adequate to fire the SCR 54. For this initial firing of the SCR 54 and so as to connect the primary winding 46 across the source 36, a positive bias voltage determined by the voltage division from the resistors 60 and 62, which are connected by the power switch 82 and a conductor 63 to the source 36, is developed at the junction 86. Once the SCR 54 is turned on the junctions 88 and 90 become positive as the capacitors 78 and 80 charge to a certain point determined by the parameters selected and time constants wanted. Because the inductor 56 operates to continue current flow in the forward direction through the SCR 54, the capacitor 78 will discharge through the SCR 54 also in the forward direction until a negative charge is acquired. This negative or reverse charge on the capacitor 78 results in a tendency for the capacitor 78 to discharge in the reverse direction through the SCR 54. The SCR 54 is, of course, as a result, turned off. To protect the SCR 54 against damage from any high reverse voltage transients that might occur during this tendency for the capacitor 78 to discharge backwards through the SCR 54, the branch 72 is provided. The rectifier 74 and the resistor 76 in this branch 72 together cooperate to provide a bleeder path around the SCR 54 for these transients. The capacitor 80 will also discharge, but primarily through the winding 46, and thus contribute along with the reverse current through the inductor 56 to the positive recharging of the capacitor 78, and the juncture 90 will again become positive as the positive charge on the capacitor 78 is restored. When the capacitor 80 commences to discharge, the junction 88 becomes negative but is returned to its positive polarity by the DC source 36. In effect, the DC source 36 returns whatever energy is withdrawn to fire the gap and continue the cyclic operation of the tank circuit 38. This, as mentioned, is facilitated by the choke coil 84.

The foregoing describes an on-off cycle for the SCR 54, which is repeated when the junctions 88 and 90 are being returned to their starting positive polarity and the control winding 50 again is energized in a direction to impose a positive turn-on voltage at the junction 86. It should be noted that after cycling has commenced, the voltage from the control winding 50 offsets the bias voltage from the resistors 60 and 62 and assumes control of the turn-on of the SCR 54 so that the switching is at the resonant frequency of the tank circuit 38. In the meantime, the tank circuit 38 is being driven substantially at its resonant frequency with adequate energy being added to insure that the tank circuit 38 continues to operate during both its negative and positive half-cycles of operation. The various parameters of the power supply 18, such as the capacitance and inductance values, are chosen so that the charging and discharging of the capacitors 78 and 80 is at the resonant frequency of the tank circuit 38. Consequently, the power supply 18, in effect, locks in at the frequency at which the tank circuit 38 is driven. By way of example only, a 25 kc. output has been obtained while employing a 100 volt source 36 and with the capacitors 40, 80 and 78 having, respectively, 200 volts RMS, 500 volts RMS and 200 volts peak to peak values.

In now relating the operation of the power supply 18 to the operation of the other parts of the apparatus, it will be noted that, e.g., when the junction 88 in the power supply 18 is going positive, the rectifier 52, because of the corresponding voltage developed by the secondary load winding 48, will commence to conduct and a discharge will occur across the gap. Subsequently, when the tank circuit 38 is driving during the next half-cycle, the rectifier 52 will become nonconductive and block the current flow in the opposite direction; hence, no discharge will occur across the gap. The rectifier 52 then performs a half-wave rectification function and preferably conducts when the SCR 54 is on. It may be possible or even desirable in some applications to apply full AC power across the gap and thus not discard one half-cycle of the power. Consequently, the rectifier 52 could be eliminated.

With the workpiece 12 being machined, the apparatus will perform as just described, with the pulsating energy being continuously supplied to the gap, while the gap spacing is maintained by the operation of the gap spacing control 20 and the feed mechanism 16. The pulsating energy produces in a well known way the stock removing discharges across the dielectric fluid-filled gap.

The workpiece 12 can next be hardened by applying a coating of paste-like substance comprising particles of an alloying material, such as titanium or tungsten carbide, and a suitable liquid solvent, such as trichloroethylene. Of course, the dielectric fluid will have been removed from the tank 14. After the coating is applied, the pulsating energy from the power supply 18 is again applied to the gap and the cutting tool 10 fed into the workpiece 12 at the appropriate speed. The resultant discharges across the gap melt the coating and the hard, wear-inhibiting surface results.

It will now be appreciated that by driving the tank circuit 38 in the foregoing way, a power supply utilizing a DC source can effectively and inexpensively provide pulsating energy to a load, thus avoiding the need for a costly motor-generator set or some other equivalent. The tank circuit 38 additionally affords the very worthwhile advantage of continuously storing energy from the source so that it is readily available whenever fluctuations in load requirements occur. Exemplary of this is the fact that even with the DC source 36 turned off, the tank circuit 38 will continue to resonate and provide energy to the gap for a short interval.

The invention is to be limited only by the following claims.

What is claimed is:

1. In a power supply for applying pulsating energy across a gap formed between conductive tool and workpiece electrodes, the combination of a DC source of energy, a parallel resonant circuit, means coupling the source and the parallel resonant circuit across the gap, and means operating the parallel resonant circuit at substantially the resonant frequency thereof and also the coupling means, the operating means including switching means operative in response to the operation of the parallel resonant circuit to cause the coupling means to supply energy from the source to the gap and also to the parallel resonant circuit for driving the parallel resonant circuit.

2. The combination described in claim 1 wherein the switching means includes a controlled rectifier operative in one of the plural states thereof to cause the coupling means to supply energy from the source to the gap and also to the parallel resonant circuit for driving the parallel resonant circuit, and means causing the controlled rectifier to operate in each of the plural states for predetermined time intervals corresponding to the resonant frequency of the parallel resonant circuit.

3. In a power supply for applying pulsating energy across a gap formed between conductive tool and workpiece electrodes; the combination of a DC source of energy; a parallel resonant circuit; transformer means coupling the source and the parallel resonant circuit across the gap; the transformer means including a primary winding, a secondary load winding connected across the gap, and a secondary control winding; and means operating the parallel resonant circuit at substantially the resonant frequency thereof; the operating means including a controlled rectifier operative in one of the plural states thereof to connect the primary winding to the source so as to supply energy of one polarity to the gap and also to the parallel resonant circuit for driving the parallel resonant circuit during one half-cycle thereof, the secondary control winding being operative to cause the controlled rectifier to assume the one plural state, and means storing a certain amount of energy from the source during the one half-cycle and thereafter releasing the stored energy to a predetermined energy level so as to cause the controlled rectifier to be changed to the other of the plural states and cause the transformer means to supply energy from the source of the opposite polarity to the parallel resonant circuit for driving the parallel resonant circuit during the other half-cycle thereof.

4. In a power supply for applying pulsating energy across a gap formed between conductive tool and workpiece electrodes; the combination of a DC source of energy; a parallel resonant circuit; transformer means coupling the source and the parallel resonant circuit across the gap; the transformer means including a primary winding, a secondary load winding connected across the gap and a secondary control winding; and means operating the parallel resonant circuit at substantially the resonant frequency thereof; the operating means including a controlled rectifier having conductive and nonconductive states and being operative in one of the states thereof to connect the primary winding across the source so as to apply energy of one polarity to the secondary load winding and also to the parallel resonant circuit to drive the parallel resonant circuit during one half-cycle thereof, the secondary control winding being operative to cause the controlled rectifier to assume the one state thereof, capacitive means storing energy from the source during the one half-cycle, and means operative when a certain amount of energy is stored by the capacitive means to cause the release thereof to a predetermined energy level so as to change the controlled rectifier to the other state thereof and cause the transformer means to apply energy from the source of the opposite polarity to the parallel resonant circuit for driving the parallel resonant circuit during the other half-cycle thereof.

5. In a power supply for applying energy across a gap formed between conductive tool and workpiece electrodes; the combination of a DC source of energy; a parallel resonant circuit; means coupling the source and the parallel resonant circuit across the gap; the coupling means including a transformer having a plurality of windings including a primary winding, a secondary load winding connected across the gap, and a secondary control winding; and means operating the parallel resonant circuit at substantially the resonant frequency thereof; the operating means including a controlled rectifier operative in the conductive state thereof to connect the primary winding across the source to initiate the application of energy of one polarity to the secondary load winding and also to the parallel resonant circuit to drive the parallel resonant circuit during one half-cycle of operation thereof, means cooperating with the secondary control winding to cause the controlled rectifier to assume the conductive state upon initiating a certain polarity of energization of the secondary control winding, capacitive means connected across the controlled rectifier and arranged to store energy from the source during the one half-cycle, inductance means operative when a certain amount of energy is stored by the capacitive means to cause the release thereof so that the capacitive means at a predetermined energy level biases the controlled rectifier to the nonconductive state and the primary winding is connected across the source so that energy of the opposite polarity is applied to the secondary load winding and also to the parallel resonant circuit to drive the parallel resonant circuit during the other half-cycle of operation thereof.

References Cited

UNITED STATES PATENTS

| | | | |
|---|---|---|---|
| 846,672 | 3/1907 | Koch | 321—46 |
| 2,276,832 | 3/1942 | Dome | 321—2 |
| 2,920,259 | 1/1960 | Light | 321—2 |
| 3,062,985 | 11/1962 | Webb. | |
| 3,213,257 | 10/1965 | Ferguson. | |

JOSEPH V. TRUHE, Primary Examiner

R. F. STAUBLY, Assistant Examiner

U.S. Cl. X.R.

321—2, 46